United States Patent
Hutchin et al.

(10) Patent No.: US 6,861,584 B2
(45) Date of Patent: Mar. 1, 2005

(54) FLUSH-TO-GRADE VAULT WITH WALL-MOUNTED CROSS-CONNECT PANELS

(75) Inventors: Scott W. Hutchin, San Miguel, CA (US); Ronnie B. Henry, Jr., Paso Robles, CA (US); Henry Diaz, Los Osos, CA (US)

(73) Assignee: Stockdale Communications Incorporated, San Miguel, CA (US)

( * ) Notice: Subject to any disclaimer, the term of this patent is extended or adjusted under 35 U.S.C. 154(b) by 0 days.

(21) Appl. No.: 10/407,579

(22) Filed: Apr. 4, 2003

(65) Prior Publication Data

US 2004/0194991 A1 Oct. 7, 2004

(51) Int. Cl.[7] .............................. H02G 3/08; H02G 9/10
(52) U.S. Cl. .......................... 174/50; 174/37; 361/600; 52/20
(58) Field of Search .............................. 174/50, 37, 48, 174/38, 52.1, 17 R, 59, 63; 220/3.2, 3.3, 3.8, 4.02; 361/600, 601, 641, 724, 725, 726, 727; 455/575.1, 347, 128; 52/19, 20

(56) References Cited

U.S. PATENT DOCUMENTS

| | | | | |
|---|---|---|---|---|
| 3,438,157 A | * | 4/1969 | Monica | 52/20 |
| 3,955,868 A | | 5/1976 | Kindermann et al. | 339/18 B |
| 4,273,966 A | | 6/1981 | Briggs et al. | 179/98 |
| 4,541,209 A | * | 9/1985 | Hoag | 174/37 |
| 4,563,053 A | | 1/1986 | Pavel | 339/242 |
| 4,709,120 A | * | 11/1987 | Pearson | 174/37 |
| 4,773,196 A | * | 9/1988 | Yoshida et al. | 174/48 |
| 4,876,629 A | * | 10/1989 | Phillips | 174/37 |
| 5,190,408 A | * | 3/1993 | Ozeki et al. | 174/37 |
| 5,235,133 A | * | 8/1993 | Roth et al. | 174/37 |
| 5,263,298 A | * | 11/1993 | Ballesteros | 174/37 |
| 5,317,474 A | | 5/1994 | Capper et al. | 361/119 |
| 5,401,902 A | | 3/1995 | Middlebrook et al. | 174/38 |
| 5,435,747 A | | 7/1995 | Franckx et al. | 439/409 |
| 5,635,673 A | | 6/1997 | Foss | 174/65 R |
| 5,692,582 A | | 12/1997 | Lindemood | 182/133 |
| 5,722,204 A | | 3/1998 | Stieb et al. | 52/20 |
| 5,734,776 A | | 3/1998 | Puetz | 385/134 |
| 5,889,231 A | * | 3/1999 | Marusinec et al. | 174/50 |
| 5,894,105 A | * | 4/1999 | Scyocurka | 174/37 |
| 5,925,848 A | * | 7/1999 | Elliott, Jr. | 174/50 |
| 6,031,349 A | | 2/2000 | Hard et al. | 318/466 |
| 6,061,976 A | * | 5/2000 | Willbanks, Jr. | 52/169.6 |
| 6,106,314 A | | 8/2000 | McLean et al. | 439/188 |
| 6,116,961 A | | 9/2000 | Henneberger et al. | 439/668 |
| 6,157,766 A | | 12/2000 | Laniepce et al. | 385/134 |
| 6,265,842 B1 | | 7/2001 | Hard et al. | 318/466 |
| 6,293,301 B1 | * | 9/2001 | Griffin et al. | 137/377 |
| 6,316,728 B1 | | 11/2001 | Hoover et al. | 174/65 R |
| 6,352,451 B1 | | 3/2002 | Henneberger et al. | 439/668 |
| 6,401,400 B1 | * | 6/2002 | Elliott | 174/37 |
| 6,422,902 B1 | | 7/2002 | Ogren et al. | 439/668 |
| 6,503,105 B1 | | 1/2003 | Johnsen | 439/668 |

* cited by examiner

Primary Examiner—Dean A. Reichard
Assistant Examiner—Angel R. Estrada
(74) Attorney, Agent, or Firm—Donald S. Dowden; Cooper & Dunham LLP

(57) ABSTRACT

A vault is contructed for mounting in the ground and formed with at least one wall defining an interior space. At least one cross-connect panel is mounted on the wall in stationery relation thereto. Signal conductors are attached to the panel and extend through the wall. A top cover enables ingress to and digress from the interior space by service personnel.

3 Claims, 4 Drawing Sheets

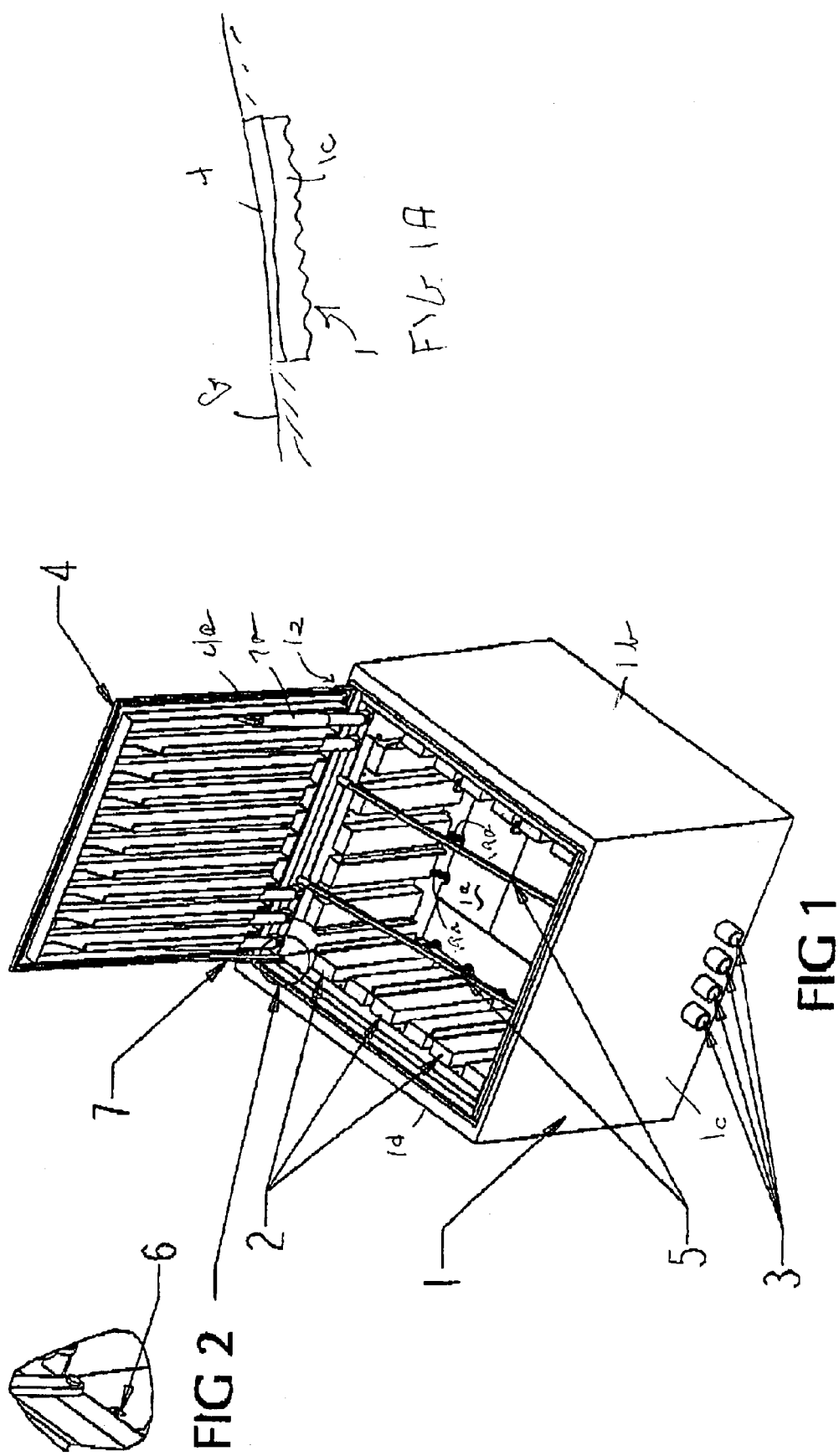

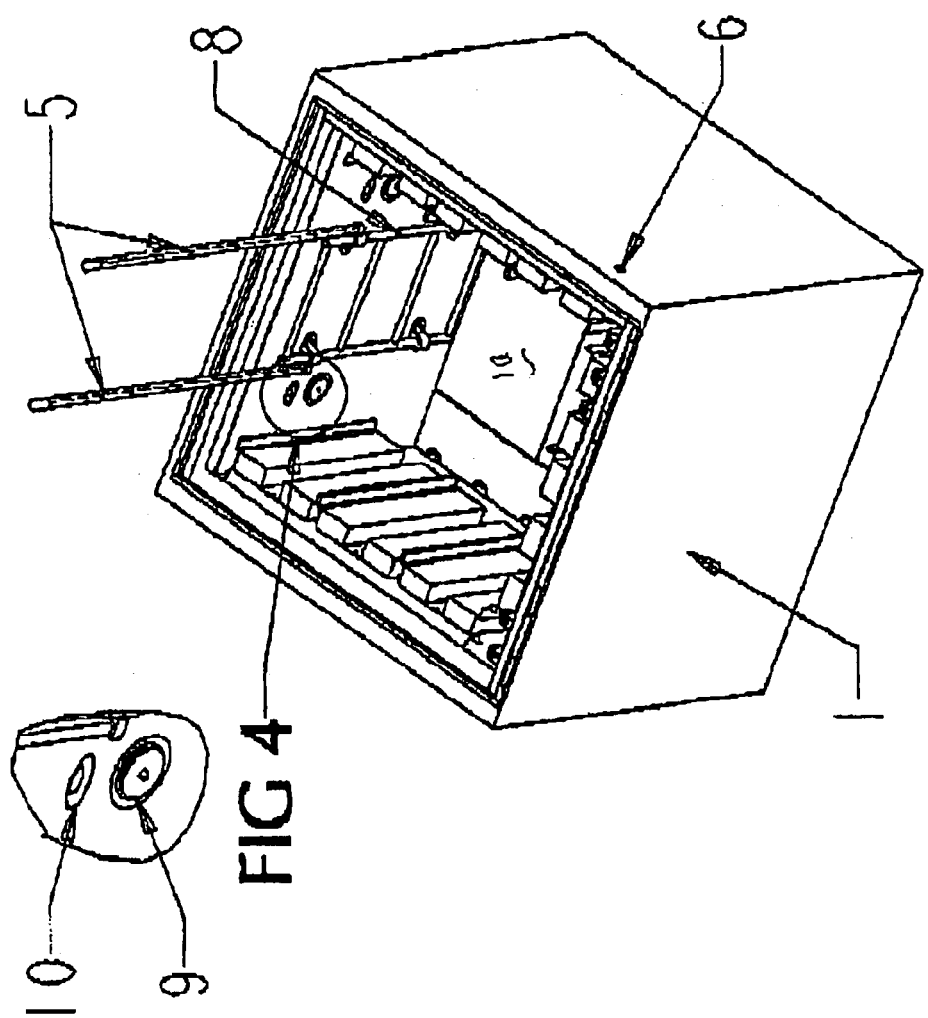

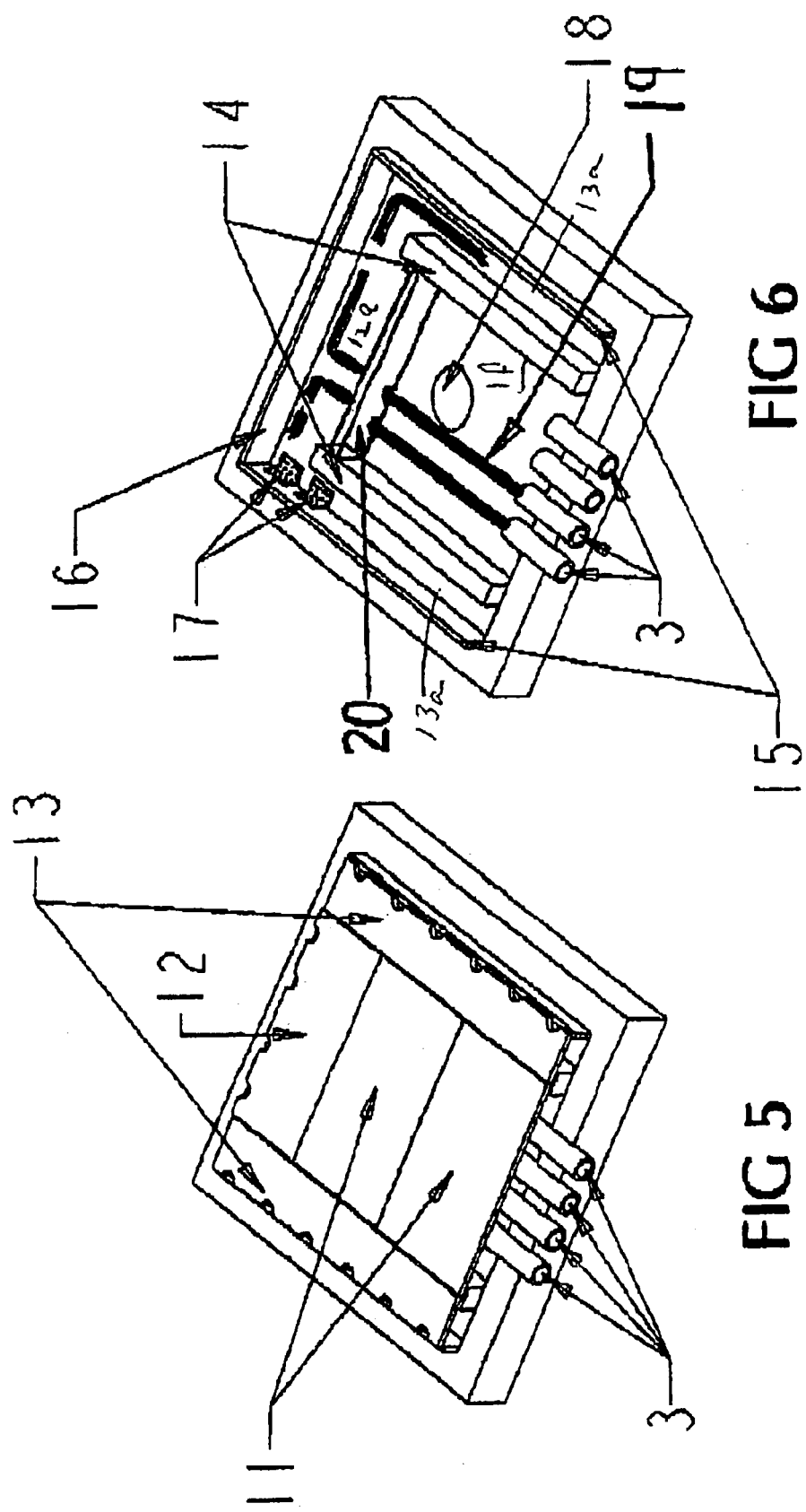

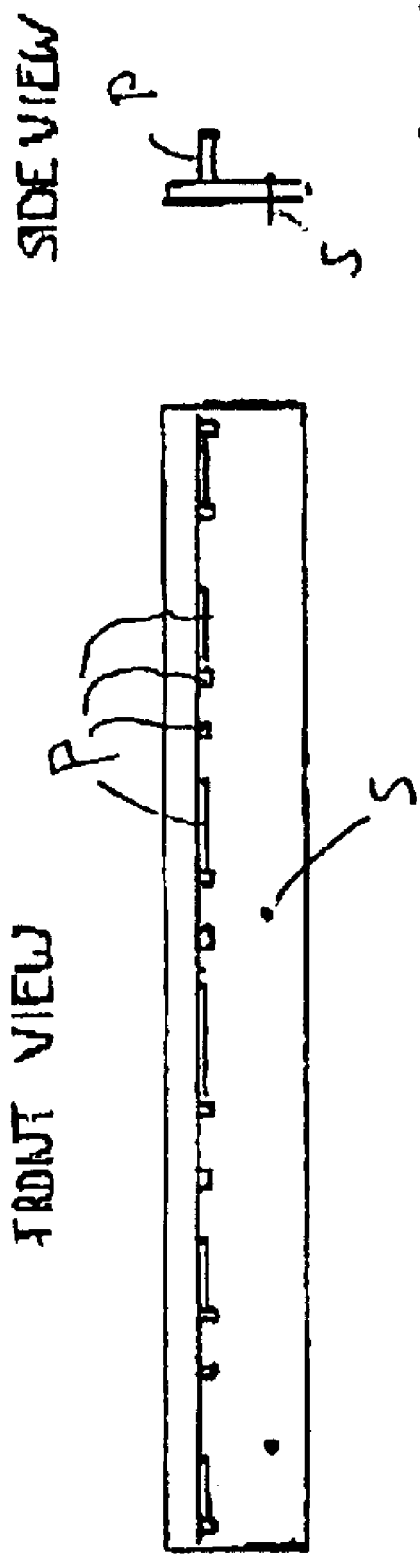
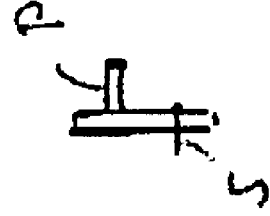

FLUSH-TO-GRADE VAULT WITH WALL-MOUNTED CROSS-CONNECT PANELS

BACKGROUND OF THE INVENTION

1. Field of the Invention

This invention relates to housings for electrical and related telecommunication equipment. More particularly, it relates to a novel and highly effective vault that affords easy servicing of such equipment and maximum protection of the equipment between visits by service personnel, and that can be accommodated within the space provided by existing easements for such equipment.

2. Description of the Prior Art

Cross-connect equipment is standard in the telephone industry and well known to those skilled in the art. It is described in numerous patents and other printed documents and available from a number of commercial sources. The present invention is not characterized by the details of such equipment.

Telephone companies have for years struggled with the fact that on about every street corner in the US and other countries there is a large gray box or cabinet that houses telephone cross connect equipment. The boxes present a number of problems. First, they are an eyesore to an already cluttered urban landscape. Second, they are a liability issue as they typically encroach on pedestrian sidewalks. Third, since they are located at street corners they are the unintended targets of vehicles that routinely run them over, knocking out telephone service for local customers and costing the telephone companies a lot of money to repair.

One proposed solution has been to devise a method for placing the cross-connect equipment in waterproof vaults below grade. The problem is that you cannot simply lower the contents of the cabinet into an underground vault. The cross-connect equipment is mounted on panels that a technician can access from both front and back. Providing adequate access to the panels would require a very large vault, since a technician must be able to walk completely around the panels. The cost of such a vault is prohibitive, not to mention the fact that there is not enough space on the street corners where the telephone companies have existing easements.

An underground vault needs to have approximately the same footprint as the above-ground cabinet it replaces. To accomplish this, companies have been pursuing a "pop-up" cabinet, in which the cross-connect equipment is mounted on a springloaded panel that is then tilted forward so that it is flush with the sidewalk and covered with a waterproof door. To service the cross-connect equipment, the technician opens the door, tilts the panel up, and steps down into the vault, which is about 36 inches deep. When finished, he steps back up on to the sidewalk, folds the panel forward, and closes the waterproof door.

The problem with this design is meeting telephone company requirements for failure testing of the telephone cables that get flexed when the panel pops up. The panels must be capable of popping up 24,000 times without the telephone cables breaking from the flexing. To date no one has come up with a solution for this cable stress. In addition there is some concern about panel frames accidentally releasing during servicing of the equipment and trapping or injuring a technician.

OBJECTS AND SUMMARY OF THE INVENTION

An object of the invention is to remedy the problems of the prior art noted above. In particular, an object of the invention is to provide a housing (vault) for cross-connect equipment that minimizes the cost of installing, protecting and servicing the equipment.

In accordance with one aspect of the invention, the foregoing and other objects are attained by providing a vault constructed for mounting in the ground and formed with at least one wall defining an interior space, at least one cross-connect panel mounted on the wall in stationary relation thereto, and a plurality of signal conductors attached to the panel and extending through the wall. Means is provided enabling ingress to and egress from the interior space by service personnel.

In accordance with an independent aspect of the invention, there is provided a combination of a vault mounted in the ground flush to grade and formed with four side walls defining an interior space, and telephone equipment mounted within the interior space. The telephone equipment comprises a plurality of cross-connect panels mounted on a plurality of the side walls in stationary relation thereto. A plurality of signal conductors is attached to each of the panels and extends through at least one of the side walls. Means is provided enabling ingress to and egress from the interior space by service personnel for servicing the equipment.

In accordance with another independent aspect of the invention, there is provided a method of servicing telephone equipment comprising the steps of providing a vault having at least one wall defining an interior space, mounting the vault in the ground flush to grade, and mounting at least one cross-onnect panel on the wall in stationary relation thereto. Telephone signal conductors are extended through the ground and wall, into the interior space and to the panel. Service personnel enter the interior space, access the panel to effect servicing of the equipment without substantially flexing the conductors, and exit the interior space.

BRIEF DESCRIPTION OF THE DRAWINGS

A better understanding of the objects, features and advantages of the invention can be gained from the following detailed description of the preferred embodiments thereof, in conjunction with the appended figures of the drawing, wherein:

FIG. 1 is a perspective view of a housing constructed in accordance with the invention in an open configuration;

FIG. 1A is a fragmentary view in elevation of the housing mounted in the ground and in a closed configuration;

FIG. 2 is a view of a detail of FIG. 1;

FIG. 3 is a perspective view of a portion of the housing of FIG. 1 in a modified configuration;

FIG. 4 is a view in elevation of a portion of FIG. 3;

FIG. 5 is a perspective view of a portion of the housing providing means for protecting signal conductors from damage caused by the weight of personnel servicing the equipment;

FIG. 6 is a view similar to FIG. 5 showing splice chambers in a raceway for the signal conductors;

FIG. 7 is a view in front elevation of a universal frame mount bracket constructed in accordance with the invention; and FIG. 8 is a view in left side elevation of the structure of FIG. 7.

DESCRIPTION OF THE PREFERRED EMBODIMENTS

FIG. 1 shows a housing or vault 1 constructed in accordance with the invention. It is constructed for mounting in the ground G (FIG. 1A) and is formed with at least one wall defining an interior space 1a. The vault 1 can in principle be spherical or cylindrical or have another shape but in the preferred embodiment comprises rectangular (possibly though not necessarily square) side walls 1b, 1c, 1d and 1e, a top or cover 4, and a bottom 1f (FIG. 6).

At least one cross-connect panel is mounted on at least one of the walls. Preferably, a plurality of such panels 2 are mounted on a plurality of the walls. The cross-connect panels 2 respectively comprise frames and blocks and are mounted in stationary relation with respect to the walls of the housing or vault 1. Once installed, the conductors never need to be flexed during their entire service life.

Ducts 3 are provided for leading cables 19 (FIG. 6) through a wall of the vault and into the interior space 1f. Floor covers 11 (FIG. 5) enable service personnel to enter the interior space 1a (FIGS. 1 and 2) to service the equipment as explained below while not treading upon the cables or signal conductors 19. A front splice chamber lid 12, side splice chamber lids 13 and the floor covers 11 help to form a raceway for the cables or signal conductors 19. The raceway comprises a front splice chamber 12a (FIG. 6) and side splice chambers 13a. Splice chamber curbs 14 and a front splice chamber panel 20 assist in supporting the front splice chamber lid 12, side splice chamber lids 13 and floor covers 11. Side splice chamber lid supports 15 and a front splice chamber lid support 16 provide further support. The cables or signal conductors 19 are fanned out and run up the side walls to the several cross-connect panels 2 as indicated at 19a (FIG. 1).

FIG. 2 shows the ground bar in detail. A ground bar 6 is provided that extends through a side wall to provide interior and exterior grounds. Ground plates 17 (Fig. b) are provided to enable a good ground connection.

FIG. 4 shows the details of a jumper wire spool with mounting bracket 9 and a single pair test probe with mounting dish 10.

A sump 18 (FIG. 6) is provided for collecting out any water that accidentally gets into the vault during servicing, as during a rain shower, so that it can be pumped out.

In accordance with the invention, means is provided enabling ingress to and egress from the interior space 1a by service personnel. In a preferred embodiment of the invention, the vault cover 4 is hinged so that it can be opened as in FIG. 1 or closed as in FIG. 1A. To enable access to the vault for servicing., the vault cover 4 is raised from the position of FIG. 1A to the position of FIG. 1. A latch 7 secures the vault cover in the desired position, and a device 7a, which can be pneumatic or hydraulic or powered by a spring, assists in raising and lowering the cover 4.

A ladder 8 (FIG. 3) is provided, together with ladder supports 5. The ladder supports 5 are articulated with respect to the ladder 8. The ladder 8 is mounted for permanent storage within the vault, and the ladder supports 5 can be moved from the stored position illustrated in FIG. 1 to the extended position illustrated in FIG. 3 to enable a technician to enter and leave the vault. When the technician completes his work and leaves the vault, the ladder supports 5 are returned to the position shown in FIG. 1, and the vault cover 4 is closed. A gasket 4a (FIG. 1) helps to maintain the watertight integrity of the vault.

FIGS. 7 and 8 show a universal frame mount bracket constructed in accordance with the invention. This bracket runs horizontally along the walls near the bottom for attachment of the panels. As those skilled in the art are aware, the brackets that support the tops of the panels conform to a standard observed by all of the major manufacturers. The conventionally required bottom brackets are, however, different. The structure of FIGS. 7 and 8 can be used with the panels provided by all of the major manufacturers. Screws 5 are provided to connect the bracket to the bottom of the wall, and protrusions P of various sizes extend out from the bracket to engage the bottom of a panel. The dimensions and spacing of the protrusions are predetermined to accommodate the brackets supplied by the major manufacturers. Thus any such panel can be attached to the standard top bracket and clipped to the universal frame mount bottom bracket of FIGS. 7 and 8. Panels so attached can be pivoted out to permit access to the rear side.

Thus there is provided in accordance with the invention a novel and highly effective vault, a vault in combination with telephone equipment, and a method of servicing telephone equipment. Many modifications of the preferred embodiments of the invention disclosed herein will readily occur to those skilled in the art. All such modifications as fall within the scope of the appended claims are included within the invention.

What is claimed is:

1. A vault constructed for mounting in the ground and formed with at least one wall defining an interior space, at least one cross-connect panel mounted on the wall in stationary relation thereto, a plurality of signal conductors attached to the panel and extending through the wall, and means enabling ingress to and egress from the interior space by service personnel;

further comprising four side walls and is substantially rectangular in plan view;

further comprising a bottom wall and a top wall and further comprising a raised floor mounted in the vault above the bottom wall for supporting the service personnel, further comprising a raceway formed between the floor and the bottom wall, and wherein the signal conductors extend through one of the side walls, through the raceway, and up one of the side walls to the panel.

2. A vault according to claim 1 wherein the raceway comprises a splice chamber.

3. In combination, a vault mounted in the ground flush-to-grade and formed with four side walls defining an interior space and telephone equipment mounted within the interior space, the telephone equipment comprising a plurality of cross-connect panels mounted on a plurality of the side walls in stationary relation thereto, a plurality of signal conductors attached to each of the panels and extending through at least one of the side walls, and means enabling ingress to and egress from the interior space by service personnel for servicing the equipment; and further comprising a universal bracket attached to at least one of the walls near the bottom of said at least one wall for attaching panels of different designs.

* * * * *